(12) United States Patent
Imanishi (10) Patent No.: US 8,994,839 B2
(45) Date of Patent: Mar. 31, 2015

(54) LENS DEVICE, DRIVE METHOD, RECORDING MEDIUM, AND IMAGE CAPTURING DEVICE

(71) Applicant: FUJIFILM Corporation, Tokyo (JP)

(72) Inventor: Kazutaka Imanishi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/332,503

(22) Filed: Jul. 16, 2014

(65) Prior Publication Data

US 2014/0327813 A1 Nov. 6, 2014

Related U.S. Application Data

(63) Continuation of application No. PCT/JP2013/050759, filed on Jan. 17, 2013.

(30) Foreign Application Priority Data

Jan. 24, 2012 (JP) ................................ 2012-012080

(51) Int. Cl.
| | | |
|---|---|---|
| *H04N 5/228* | (2006.01) | |
| *G02B 7/04* | (2006.01) | |
| *G03B 17/14* | (2006.01) | |
| *H04N 5/232* | (2006.01) | |
| *H04N 5/225* | (2006.01) | |

(Continued)

(52) U.S. Cl.
CPC *G02B 7/04* (2013.01); *G03B 17/14* (2013.01); *H04N 5/23296* (2013.01); *G02B 7/102* (2013.01); *G02B 7/34* (2013.01); *G03B 2205/0053* (2013.01); *G03B 2206/00* (2013.01)

USPC .................. 348/208.7; 348/208.11; 348/357; 348/360; 348/362; 396/55; 396/554

(58) Field of Classification Search
USPC .................. 348/208.7, 208.11, 357, 360, 362
See application file for complete search history.

(56) References Cited

U.S. PATENT DOCUMENTS 4,725,720 A 2/1988 Sawada et al.
5,825,531 A * 10/1998 Otomo ........................ 359/368

(Continued)

FOREIGN PATENT DOCUMENTS

JP 61-27019 a 12/1986
JP 9-258086 A 10/1997

(Continued)

OTHER PUBLICATIONS

International Search Report issued in PCT/JP2013/050759, filed on Apr. 2, 2013.
PCT/Isa/237—Issued in PCT/JP2013/050759, mailed on Apr. 2, 2013.

*Primary Examiner* — Hung Lam
(74) *Attorney, Agent, or Firm* — Birch, Stewart, Kolasch & Birch, LLP (57) ABSTRACT

The present invention provides a lens device, a drive method, a recording medium, and an image capturing device. According to an aspect of the present invention, in an one-sided drive mode which allows the lens to move beyond a target position, and then to move in a reverse direction and stop at the target position, the control part controls the lens on the basis of the brake ON/OFF information so that when the lens is temporarily stopped, braking by the brake part is not applied, and only when the lens is stopped at a final target position, braking by the brake part is applied.

9 Claims, 7 Drawing Sheets

(51) Int. Cl.
*G02B 7/10* (2006.01)
*G02B 7/34* (2006.01)

(56) References Cited

U.S. PATENT DOCUMENTS 5,887,201 A * 3/1999 Maeno ............................ 396/86
5,973,471 A * 10/1999 Miura et al. .................. 318/640
6,104,880 A * 8/2000 Kamishita et al. ............. 396/133
6,721,012 B2 * 4/2004 Kawamura et al. ........... 348/335
8,649,088 B2 * 2/2014 Shirota ......................... 359/379

FOREIGN PATENT DOCUMENTS

JP 11-95083 A 4/1999
JP 2005-156738 A 6/2005

* cited by examiner

LENS DEVICE, DRIVE METHOD, RECORDING MEDIUM, AND IMAGE CAPTURING DEVICE

CROSS-REFERENCE TO RELATED APPLICATIONS

This application is a Continuation of PCT International Application No. PCT/JP2013/050759, filed on Jan. 17, 2013, which claims priority under 35, U.S.C. §119(a) to Japanese Patent Application No. 2012-012080, filed on Jan. 24, 2012. Each of the above application(s) is hereby expressly incorporated by reference, in its entirety, into the present application.

BACKGROUND OF THE INVENTION

1. Field of the Invention

The present invention relates to a lens device and to lens drive in an image capturing device including a lens device.

2. Description of the Related Art

There are a television camera and a digital camera capable of automatically adjusting the zoom or focus without being manually operated by a user. In such cameras, if electric power is always supplied to a circuit related to the zoom and focus adjustment (even when zoom and focus driving are not performed), electric power is uselessly consumed. Thus, it is proposed to stop supplying electric power under a predetermined circumstance to reduce power consumption. Japanese Patent Application Laid-Open No. 2005-156738, for example, describes a television camera system performing autofocus (hereinafter referred to as AF), in which power consumption is reduced by stopping electric power supply to a part of or all of circuits in consideration of a length of time required from turning on the power until starting each of the circuits in AF mode.

Specifically, in Japanese Patent Application Laid-Open No. 2005-156738, the system is configured to stop electric power supply to a part of or all of the circuits constituting AF means when AF control is stopped, and start electric power supply to all of the circuits when the AF control is started.

SUMMARY OF THE INVENTION

Unfortunately, if electric power supply is uniformly stopped when AF control is stopped, as described in Japanese Patent Application Laid-Open No. 2005-156738, in order to prevent increase in power consumption and damage to a device due to heating, the electric power supply ends up being repeatedly stopped and started even in the case where lens drive is restarted immediately after stopped, whereby it takes time to finally complete driving. Performing such control makes those problems noticeable that a time required to complete the lens drive is increased or power consumption is increased, and the like, due to useless communication, such as a drive command and a drive state notification, between a camera body CPU and a lens CPU.

The present invention has been achieved under the circumstances above, and has an object to provide a lens device, a drive method, a lens drive program, a recording medium, capable of quickly performing lens drive, and an image capturing device including such lens device.

In order to achieve the object described above, in a first aspect of the present invention there is provided a lens device to be mounted on an image capturing device body of, the lens device including: a lens; a lens position detector for detecting a position of the lens; a lens driving part provided with an electric motor, the lens driving part transmitting driving force from the electric motor to the lens to allow the lens to move in an optical axis direction; a brake part for short-circuiting coils in the electric motor to stop the electric motor; a reception part for receiving a lens movement command including a target position of the lens and brake ON/OFF information showing whether or not the brake part brakes at the target position, from the image capturing device body; a control part for allowing the lens to move to the target position via, the lens driving part when the reception part receives the lens movement command; a determination part for determining whether or not the lens reached the target position on the basis of the target position and the detected lens position; and a transmission part for transmitting completion of the lens drive to the image capturing device body when the determination part determines that the lens reached the target position, the transmission part allowing the reception part to receive a subsequent lens movement command from the image capturing device body, the control part controlling the brake part on the basis of the brake ON/OFF information included in the lens movement command when the determination part determines that the lens reached the target position.

The lens device in accordance with the first aspect controls the brake part on the basis of the brake ON/OFF information included in the lens movement command when the determination part determines that the lens reaches the target position. Thus, when the lens reaches the target position, braking is not uniformly turned on (stop by short-circuiting coils), but it is possible to allow braking not to be turned on, on the basis of the brake ON/OFF information, in such a case where another drive is started immediately after lens drive is completed, thereby preventing the lens drive from taking a long time to perform by short-circuiting/energizing the coils each time a lens is stopped and driven. In addition, when it is determined that the lens reaches the target position, completion of the lens drive is transmitted to the image capturing device body to allow the reception part to receive a subsequent lens movement command from the image capturing device body, so that it is possible to perform a subsequent lens movement immediately after the lens reaches the target position. Even if another drive is started immediately after the lens drive is completed, it is possible to quickly perform the lens drive. A lens device in an image capturing device of an interchangeable lens type often performs communication, such as a drive command and a drive state notification, between a camera body and the lens device to allow the lens device to drive a lens on the basis of contents of the communication, therefore, the configuration of the first aspect of the present invention is especially effective.

The first aspect of the lens device may be directed to a focus lens, a zoom lens and the like, as a lens to be driven.

As shown in a second aspect of the present invention, in the lens device in accordance with the first aspect, the determination part may be configured to determine that a lens is in a drive stop state if an absolute value of a difference between a target position and a detected lens position is a threshold value or less, and determine that the lens reaches the target position if the drive stop state continues for a specified time or more after the determination.

Depending on a drive mode and a drive state of a lens, even if a difference between a target position and a current position of the lens temporarily becomes a threshold value or less, the lens sometimes moves beyond the target position to cause the difference to exceed the threshold value again. Thus, the second aspect is configured to reliably determine the arrival of a lens to the target position by determining that the lens reaches the target position if a lens drive stop state continues for a specified time or more. In addition, the second aspect is configured so that a requirement for determining that the lens is in "a drive stop state" includes that a difference between the target position of lens drive and a detected lens position is a threshold value or less. This enables desired accuracy of a lens position to be satisfied.

As shown in a third aspect of the present invention, in the lens device in accordance with the second aspect, a depth of focus of the lens may serve as the threshold value. In a lens device in accordance with the third aspect, since the depth of focus of the lens serves as a threshold value for determining that the lens is in a drive stop state, it is possible to reliably satisfy accuracy of focus while quickly performing lens drive.

As shown in a fourth aspect of the present invention, in the lens device in accordance with any one of the first to third aspects, the determination part may start determination after an estimated time for completing movement to the target position elapses since the lens movement is started. If start timing of the determination is too early, the problems that useless processing for the determination is performed and electric power is consumed or the like occur. The lens device in accordance with the fourth aspect, however, starts determination after the estimated time for completing movement of the lens device has elapsed, so that it is possible to reduce consumption of a resource (CPU power, electric power and the like) of the lens device.

As shown in a fifth aspect of the present invention, in the lens device in accordance with any one of the first to fourth aspects, the control part may output a movement speed command of the lens to the lens driving part on the basis of the detected lens position and the target position, and the determination part may conduct determination in synchronization with the output of the movement speed command. If an interval of the determination of drive completion is long, it takes a long time to finish the determination. The lens device in accordance with the fifth aspect, however, is configured to conduct determination in synchronization with the output of the movement speed command to reduce a time required to finish the determination, thereby enabling the lens drive to be completed in a short time.

In order to achieve the object described above, in a sixth aspect of the present invention, there is provided a lens drive method of a lens device to be mounted on an image capturing device body, the lens device including: a lens; a lens position detector for detecting a position of the lens; a lens driving part provided with an electric motor, the lens driving part transmitting driving force from the electric motor to the lens to allow the lens to move in an optical axis direction; a brake part for short-circuiting coils in the electric motor to stop the electric motor, the lens drive method including the steps of: receiving a lens movement command including a target position of the lens and brake ON/OFF information showing whether or not the brake part brakes at the target position from the image capturing device body; controlling the lens to move to the target position via the lens driving part when the lens movement command is received in the step of receiving; determining whether or not the lens reached the target position on the basis of the target position and the lens position detected by the lens position detector; and transmitting completion of the lens drive to the image capturing device body when it is determined that the lens reached the target position in the step of determining to enable a subsequent lens movement command to be received from the image capturing device body, and in the step of controlling the lens, the brake part is controlled on the basis of the brake ON/OFF information included in the lens movement command when it is determined that the lens reached the target position in the step of determining.

The lens drive method in accordance with the sixth aspect, similar to the lens device in accordance with the first aspect, can prevent the case in which the lens drive takes a long time to perform by short-circuiting and energizing coils each time a lens is stopped and driven, and enables the lens drive to be quickly performed even if another drive is started immediately after the lens drive is completed.

In the lens drive method in accordance with the sixth aspect, similar to the lens device in accordance with the second aspect, the step of determining may be configured to determine that a lens is in a drive stop state if an absolute value of a difference between a target position and a detected lens position is a threshold value or less, and after the determination, determine that the lens reached the target position if the drive stop state continues for a specified time or more. In addition, similar to the lens device in accordance with the third aspect, the threshold value may be a depth of focus of the lens. Also similar to the lens device in accordance with the fourth aspect, in the step of determining, determination may be started after an estimated time for completing movement to the target position elapsed since a start of movement of the lens. Also similar to the lens device in accordance with the fifth aspect, a movement speed command of the lens may be outputted to the lens driving part on the basis of the detected lens position and the target position in the step of controlling, and the determination may be conducted in the step of determining in synchronization with the output of the movement speed command.

In order to achieve the object described above, a seventh aspect of the present invention provides a lens drive program for allowing a lens device to perform the lens drive method in accordance with the sixth aspect, the lens device including: a lens; a lens position detector for detecting a position of the lens; a lens driving part provided with an electric motor, the lens driving part transmitting driving force from the electric motor to the lens to allow the lens to move in an optical axis direction; a brake part for short-circuiting coils in the electric motor to stop the electric motor; and the lens device being mounted on an image capturing device body. The lens drive program in accordance with the seventh aspect, similar to the lens drive method in accordance with the sixth aspect, enables lens drive to be quickly performed, in such a case where another drive is started immediately after lens drive is stopped, by preventing the case in which the lens drive takes a long time by repeating finish and start of excitation each time the lens is stopped and driven, and by performing communication between the lens device and the image capturing device. The lens drive program in accordance with the sixth aspect may be stored in a memory mounted in an image capturing device and a lens device (semiconductor memory) such as a ROM and an EEPROM, or may be used by being recorded in various recording media such as a magneto-optical recorder, such as a Compact Disk (CD), a Digital Versatile Disk (DVD), a hard disk, and an SSD. In addition, an eighth aspect of the present invention provides a recording medium in which the lens drive program in accordance with the seventh aspect is recorded. Recording into a recording medium is possible by storing codes of the lens drive program, which is readable by an image capturing device, a lens device, and a computer, in various non-transitory recording media such as the semiconductor memory and the magneto-optical recorder described above. The recording medium in the seventh and eighth aspects may be incorporated in an image capturing device, a lens device, and a computer, or may be mounted in a detachable manner.

In order to achieve the object described above, a ninth aspect of the present invention provides an image capturing device that includes an image capturing device body, and a lens device to be mounted on the image capturing device body, the image capturing device body including a transmission part for transmitting a lens movement command to the lens device, the lens movement command including a target position of the lens and brake ON/OFF information showing whether or not the brake part brakes at the target position, and a reception part for receiving completion of lens drive from the lens device to enable the transmission part to transmit a subsequent lens movement command to the lens device, the lens device is the lens device in accordance with any of the first to fifth aspects. The image capturing device in accordance with the ninth aspect, similar to the lens device, the lens drive method, the lens drive program, and the recording medium, of the aspects described above, enables lens drive to be quickly performed, in such a case where another drive is started immediately after lens drive is stopped, by preventing the case in which the lens drive takes a long time to perform by repeating short-circuiting and energizing each time the lens is stopped and driven, and by performing communication between the lens device and the image capturing device.

As described above, according to the lens device, the lens drive method and the lens drive program, the recording medium, and the image capturing device, pertaining to the present invention, it is possible to quickly perform lens drive.

DETAILED DESCRIPTION OF THE EMBODIMENTS

Referring to the accompanying drawings, an embodiment of the lens device, the lens drive method and the lens drive program, and the image capturing device, in accordance with the present invention, is described below in detail.

<Configuration of the Image Capturing Device>

Figure 1:
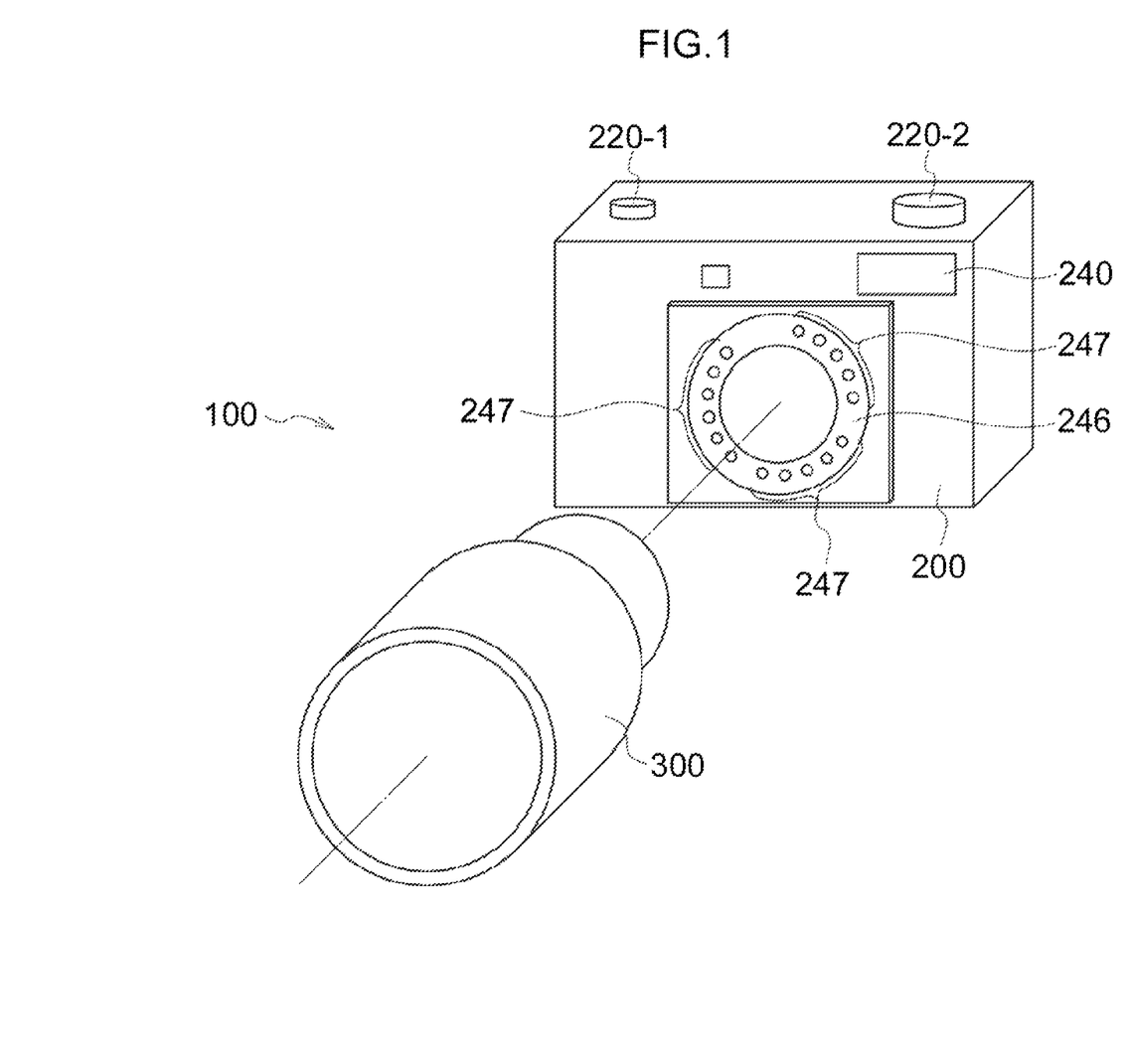
FIG. 1 is an external view of an image capturing device 100 in accordance with one embodiment of the present invention.

FIG. 1 is a perspective view showing appearance of the image capturing device 100 in accordance with one embodiment of the present invention. The image capturing device 100 includes an image capturing device body 200, and a lens device 300 to be mounted on the image capturing device body 200 in an interchangeable manner. The lens device 300 is mounted on the image capturing device body 200 in an interchangeable manner by connecting a mount 246 (a transmission part and a reception part) provided on the image capturing device body 200 to a mount 346 (a reception part and a transmission part) provided on the lens device 300, corresponding to the mount 246. In addition, the image capturing device body 200 is provided on its front face with a flash 240 other than the mount 246, and on its top face with a release button 220-1 and a dial 220-2 for setting imaging modes.

Figure 2:
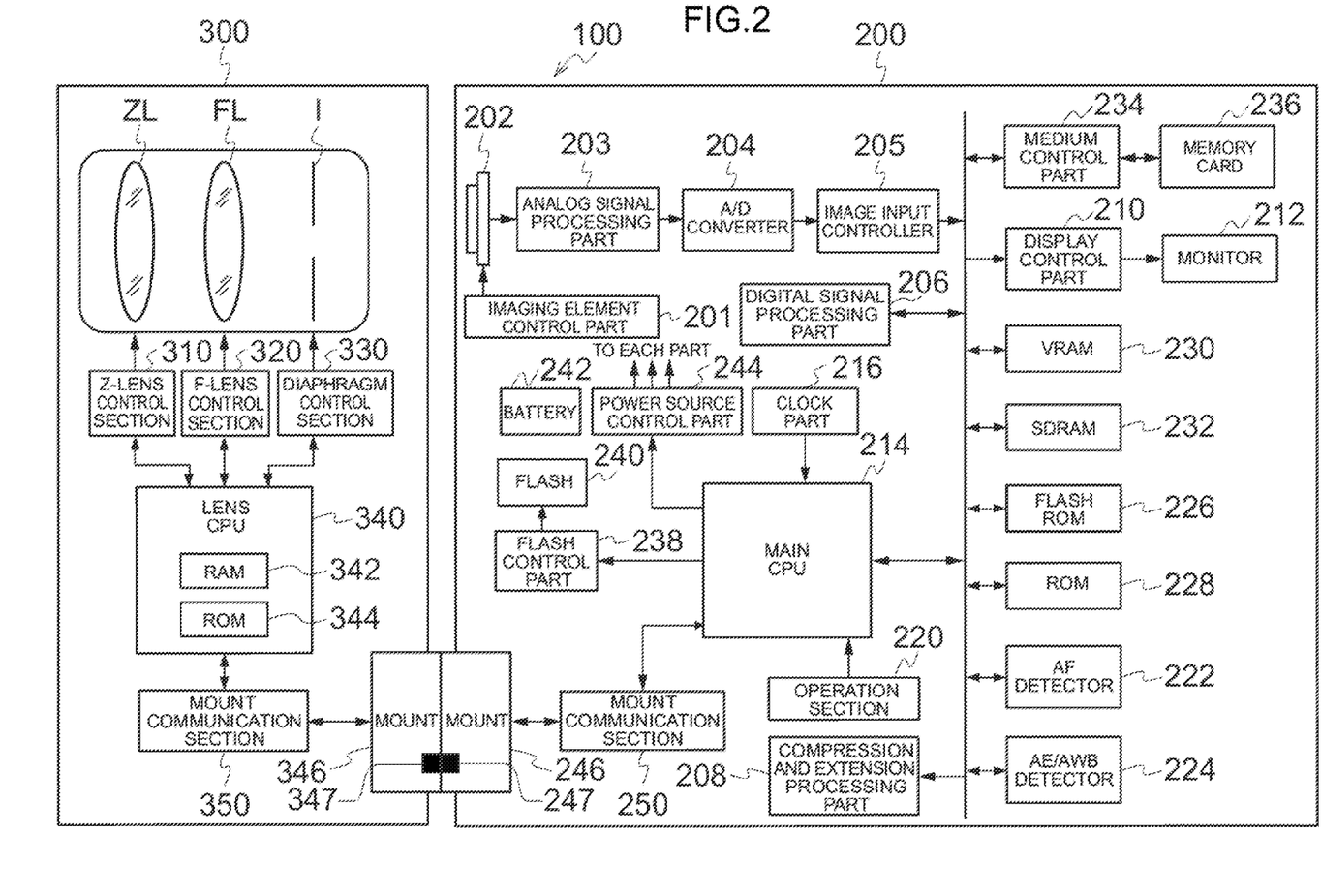
FIG. 2 is a block diagram showing configuration of a main section of the image capturing device 100.

FIG. 2 is a block diagram showing the configuration of the image capturing device 100. The operations of the image capturing device 100 are integrally controlled by a main CPU 214 of the image capturing device body 200 and a lens CPU 340 of the lens device 300. Programs (including programs for driving a zoom lens ZL, a focus lens FL, and a diaphragm I) and data required for operation of the main CPU214 are stored in a flash ROM 226 and a ROM 228 in the image capturing device body 200, and programs (including programs for driving a zoom lens ZL, a focus lens FL, and a diaphragm I) and data required for operation of the lens CPU 340 are stored in a ROM 344 in the lens CPU 340. In the present embodiment, although an example in which programs are stored in ROMs is described, the ROMs may be replaced with a rewritable device (an EEPROM or the like) to update programs as needed, or with a recording medium (such as a semiconductor memory, or a magneto-optical recording medium) detachable from the image capturing device 100 to store programs, and use the stored programs.

The image capturing device body 200 is provided with an operation section 220 including a reproduction button, a MENU/OK key, a cross key, a BACK key and the like, in addition to a release button 220-1 and a dial 220-2. Accordingly, a user can provide in instruction such as selection of an imaging/reproduction mode; start of imaging; selection, reproduction, and elimination of an image; and a zoom instruction, by operating a button and a key included in the operation section 220. Signals from the operation section 220 is inputted into the main CPU 214, and the main CPU 214 controls each of the circuits in the image capturing device body 200 on the basis of the inputted signals as well as performs transmission and reception of the signals with the lens device 300 through the mount 246 (a transmission part and a reception part) and a mount communication section 250 (a transmission part and a reception part) as described later.

The mount 246 is provided with terminals 247 (a transmission part and a reception part), and the mount 346 is provided with terminals 347 (a transmission part and a reception part). When the lens device 300 is mounted on the image capturing device body 200, corresponding terminals 247 and terminals 347 are brought into contact with each other to enable communication (since the terminals 247 and the terminals 347 in FIGS. 1 and 2 are conceptually shown, positions and the number of the terminals in the present invention are not limited to those shown in FIGS. 1 and 2).

The terminals described above include, for example, a terminal for ground, a terminal for a synchronization signal, a terminal for serial communication, a terminal for control status communication, and a terminal for power supply from a battery 242 of the image capturing device body 200 to each portion of the lens device 300.

In the imaging mode, subject light forms an image on a light receiving surface of an imaging element 202 of the image capturing device body 200 through the zoom lens ZL, the focus lens FL, and the diaphragm I of the lens device 300. In the present embodiment, although the imaging element 202 is a CMOS type, it is not limited to the CMOS type and a CCD type may be applied. The focus lens FL, the zoom lens ZL, and the diaphragm I are driven by a zoom lens control section 310, a focus lens control section 320 (lens driving part), and a diaphragm control section 330 controlled by the lens CPU 340, thereby performing focus control, zoom control, and diaphragm control.

The zoom lens control section 310 moves the zoom lens ZL in an optical axis direction in accordance with a command from the lens CPU 340 to vary imaging power. The focus lens control section 320 allows the focus lens FL to move back and forth in the optical axis direction in accordance with a command from the lens CPU 340 to focus on a subject. The diaphragm control section 330 varies a diaphragm value of the diaphragm I in accordance with a command from the lens CPU 340.

When the release button 220-1 is pressed to a first level (half press), the main CPU 214 allows AF and AE operations to start. Accordingly, image data outputted from an A/D converter 21 is taken into an AE/AWB detector 224. The main CPU 214 calculates brightness (imaging Ev value) of the subject by using an integrated value of a G signal inputted into the AE/AWB detector 224, and controls a diaphragm value of the diaphragm I, an electric charge accumulation time (corresponding to a shutter speed) in the imaging element 202, a light emission time of the flash 240 and the like, on the basis of the calculated result.

An AF detector 222 is a part to perform contrast AF processing or phase difference AF processing. When performing the contrast AF processing, the AF detector 222 controls the focus lens FL in a lens barrel so that an AF evaluation value showing a focal state calculated by integrating high frequency components of image data in a focus region provided in an imaging region of the imaging element 202 becomes maximum. In addition, when performing the phase difference AF processing, the AF detector 222 controls the focus lens FL in the lens device 300 so that a defocus amount acquired by using phase difference data calculated by using a pixel (phase difference pixel) having a plurality of phase differences, the pixel being provided in the focus region above in the image data, becomes zero.

When the release button 220-1 is pressed to a second level (all press) after the AE operation and the AF operation are finished, the flash 240 emits light controlled through a flash control part 238. Signal charges accumulated in the imaging element 202 are read out on the basis of a read-out signal supplied from an imaging element control part 201 as voltage signals corresponding to the signal charges, and are supplied to an analog signal processing part 203. The analog signal processing part 203 applies correlated double sampling processing to the voltage signals outputted from the imaging element 202 to sample-and-hold R, G, B signals of each of the pixels, and supplies the R, G, B signals to an AD converter 204 after amplifying the R, G, B signals. The A/D converter 204 converts sequentially received R, G, B analog signals into R, G, B digital signals to output the R, G, B digital signals to an image input controller 205. In a case where the imaging element 202 is a MOS type imaging element, the A/D converter 204 is often built in the imaging element 202, so that the correlated double sampling above is unnecessary.

Image data outputted from the image input controller 205 is inputted into a digital signal processing part 206, and then signal processing, such as off-set processing, gain control processing including white balance correction and sensitivity correction, gamma correction processing, and YC processing, is applied to the image data. Being written into a VRAM 230 and read out from the VRAM 230, the image data is encoded by the display control part 210 to be outputted to a monitor 212, whereby a subject image is displayed in the monitor 212.

Image data outputted from the A/D converter 204 in response to all press of the release button 220-1 is inputted into an SDRAM (memory) 232 from the image input controller 205, and is temporarily stored in the SDRAM 232. After the temporary storage in the SDRAM 232, the image data is formed into an image file through the signal processing, such as the gain control processing, the gamma correction processing, and the YC processing, by the digital signal processing part 206, and compression processing into a Joint Photographic Experts Group (PEG) format by a compression and extension processing part 208. The image file is read out by a medium control part 234 to be recorded in a memory card 236. The image recorded in the memory card 236 can be reproduced and displayed in the monitor 212 by operating a reproduction button in the operation section 220.

The release button 220-1 is not limited to a configuration of a two-step stroke type including a half-press and an all-press. On-signals S1 and S2 may be outputted by one operation, and the on-signals S1 and S2 may be outputted by providing respective buttons or switches. In addition, in a configuration in which an operation is instructed with a touch panel and the like, an operation instruction may be outputted by touching a region corresponding to the operation instruction displayed in a screen of a touch panel serving as operation means. In the present invention, if a configuration is for instruction of imaging preparation processing and imaging processing, the configuration of operation means is not limited to the configuration described above. Further, one operation instruction in the operation means may allow imaging preparation processing and imaging processing to be continuously performed.

<Communication Between an Image Capturing Device Body and a Lens Device>

Next, communication between the image capturing device body 200 and the lens device 300 is described. The image capturing device body 200 and the lens device 300 are communicated with each other through the mount 246 (a transmission part and a reception part) and the mount communication section 250 (a transmission part and a reception part) of the image capturing device body 200, and the mount 346 (a transmission part and a reception part) and a mount communication section 350 (a transmission part and a reception part) of the lens device, as well as through terminals provided in the mount 246 and the mount 346, in order to transmit and receive a lens movement command. The lens movement command includes: a control object (the zoom lens ZL, the focus lens FL, and the diaphragm I); a drive mode; a numeric value (target positions of the zoom lens ZL and the focus lens FL, a diaphragm value of the diaphragm T, and the like); and brake ON/OFF information (information showing whether or not to brake at a target position by short-circuiting coils of the motor 326). Between the image capturing device body 200 and the lens device 300, various control statuses (notification of start and completion of lens drive, and the like) other than the command above are communicated through terminals for control status communication.

<Configuration of the Focus Lens Control Section>

Figure 3:
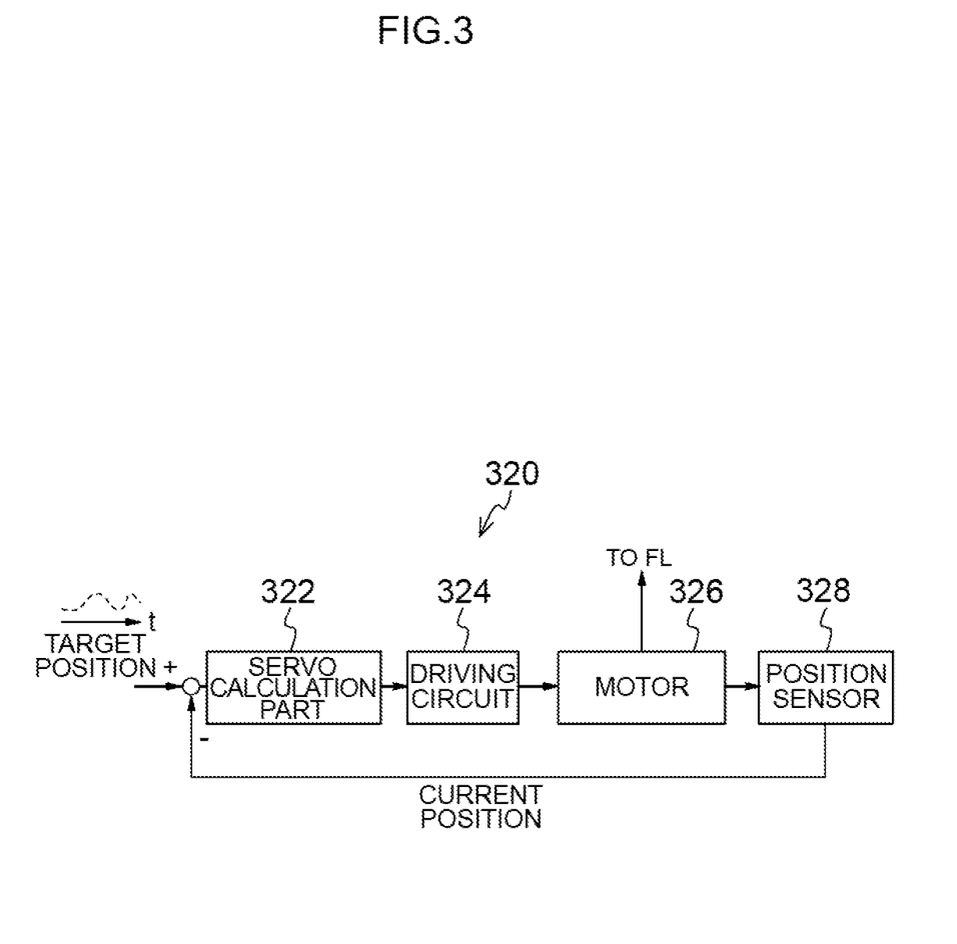
FIG. 3 is a block diagram showing configuration of a focus lens control section 320.

Next, configuration of the focus lens control section 320 (a lens driving part and a control part) is described. FIG. 3 is a block diagram showing configuration of the focus lens control section 320. A current position of the focus lens FL in the optical axis direction is detected by a position sensor 328 (lens position detector) and is inputted into a servo calculation part 322 to be used for servo calculation. The servo calculation part 322 performs servo calculation by using the lens target position received from the lens CPU 340 and the current lens position received from the position sensor 328 to output a speed command. The driving circuit 324 drives the motor 326 (electric motor) on the basis of the speed command to move the focus lens FL back and forth along the optical axis direction. The calculation is performed on the basis of the lens drive program stored in the ROM 344 and data required for the lens drive program by allowing a RAM 342 to serve as a temporary working area.

A pulse drive motor, such as a stepping motor and a servo motor, is applicable to the motor 326. When the pulse drive motor is used, a drive speed of the focus lens FL is changed by controlling a duty ratio of a pulse to be applied to the motor. The motor 326 is provided with a male screw. On the other hand, the focus lens FL is attached to a female screw part. The male screw is to be screwed into a female thread formed on an inner surface of a through-hole provided in the female screw part. Accordingly, as the motor 326 rotates, the male screw rotates to allow the female screw screwed on the male screw to move in an axial direction of the male screw to move the focus lens FL in the optical axis direction.

The zoom lens control section 310, similar to the focus lens control section 320 described above, can adopt a configuration in which a stepping motor or a servo motor is pulse-driven.

<Driving and Stopping the Motor 326>

Figure 4:
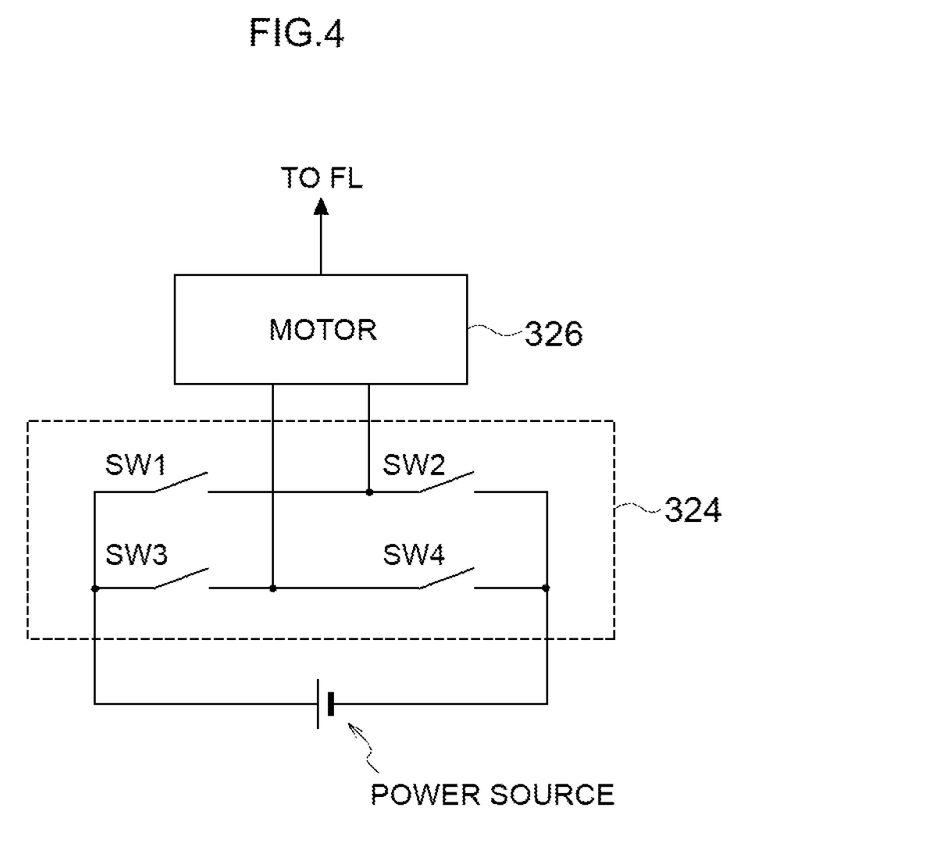
FIG. 4 schematically shows a relationship between a driving circuit 324 and a motor 326.

Next, driving the motor 326 by using the driving circuit 324 is described. FIG. 4 schematically shows a relationship between the driving circuit 324 and the motor 326. In FIG. 4, if a SW (switch, the same applies to the following) 1 and a SW 4 are simultaneously turned on, the motor 326 rotates in a constant direction, and if a SW 2 and a SW 3 are simultaneously turned on, the motor 326 rotates in a reverse direction. If all switches SW1 to 4 are turned on, the driving circuit 324 becomes an open state, so that the motor 326 that is rotating will stop immediately after rotating for a while by inertia. The driving circuit 324 controls rotation speed and direction of the motor 326 by turning on and off the switches as above and by magnitude of current.

In a case where the driving circuit 324 (brake part) is configured as above, if the SW 1 and the SW 3, or the SW 2 and the SW 4, are simultaneously turned on, coils of the motor 326 are short-circuited so that the motor 326 is braked to allow the motor 326 to stop. In the present embodiment, braking by performing short-circuiting of coils as above is referred to as "brake ON", and performing no short-circuiting of coils is referred to as "brake OFF".

<Lens Drive and Starting and Finishing Excitation>

In the configuration described above, when driving the lens, usually coils of the motor 326 are energized at the time of drive start, and the motor 326 is braked to finish energizing the coils at the time of drive completion. The operation above is performed to reduce power consumption as well as prevent heat generation due to energization for a long time However, when lens drive is performed immediately after the lens drive is stopped once, such as the cases where one-sided drive is performed in a reverse direction to remove play between the male screw and the female screw, and where a lens is moved to an initial position by detecting a home position, it takes time to finish the lens drive, and zooming and focusing time is increased, because energization is stopped by braking for each stop and must be restarted for the drive immediately after the stop. Thus, the image capturing device 100 in accordance with the present embodiment is configured so that if the brake ON/OFF information included in the lens movement command shows ON, the motor 326 is braked at the time of drive completion, and if showing OFF, the motor 326 is not braked even when the lens drive is completed.

<Lens Drive Flow>

Figure 5:
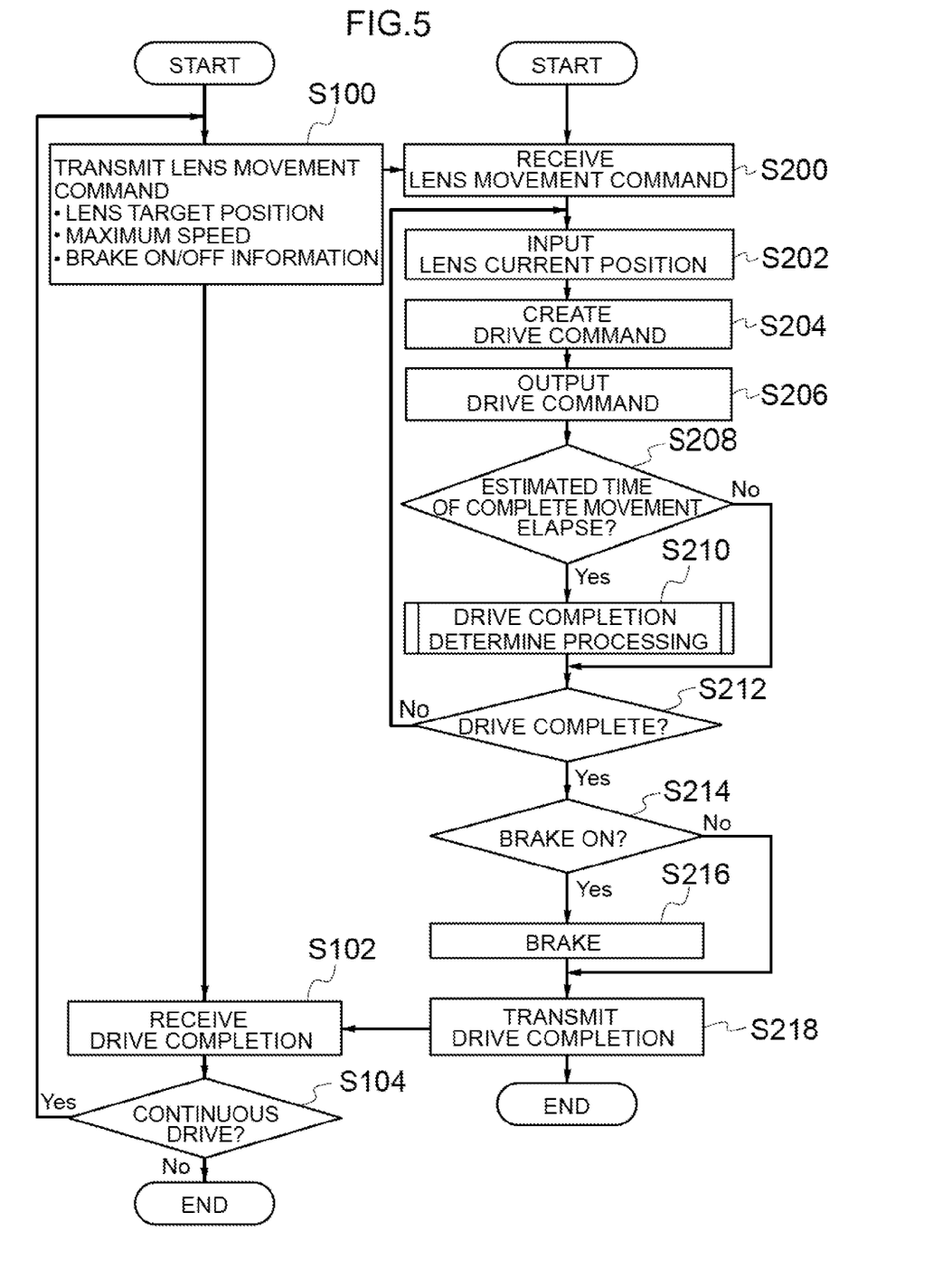
FIG. 5 is a flow chart showing an outline of lens movement processing.

FIG. 5 is a flow chart showing an outline of focus lens drive processing of the image capturing device 100. The focus lens drive processing is performed on the basis of programs and data stored in the flash ROM 226 and the ROM 228 of the image capturing device body 200, and the lens drive program and necessary data stored in the ROM 344 of the lens device 300. Firstly, at S100, the main CPU 214 (a transmission part and a reception part) of the image capturing device body 200 transmits the lens movement command, and the lens CPU 340 (a reception part and a control part) of the lens device 300 receives the lens movement command at S200 (receiving step). The transmission and reception of the lens movement command is performed through the mount 246 and the mount communication section 250 of the image capturing device body 200, and the mount 346 and the mount communication section 350 of the lens device 300, as described above. The lens movement command includes drive modes, for example: a mode of movement to an initial position by detecting a home position in response to turning on a power source of the image capturing device 100; a mode of movement to a target focus position in response to a half press of the release button 220-1; and a one-sided drive mode. The lens movement command includes a target position of the focus lens FL, a maximum drive speed Vmax of the lens, and brake ON/OFF information after drive is completed, other than the drive mode.

Figure 6:
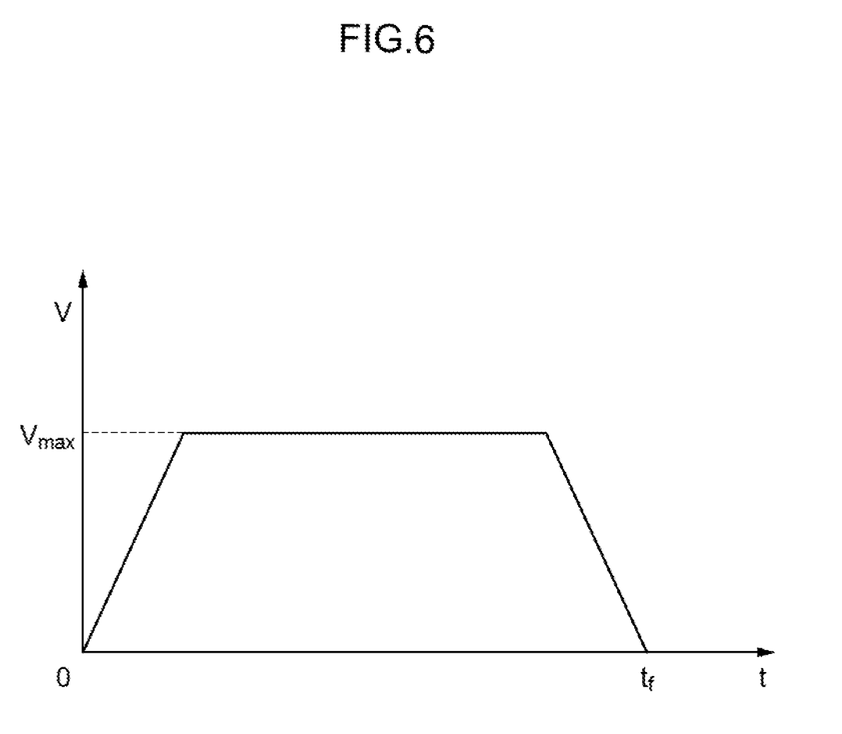
FIG. 6 is a graph showing an example of a relationship between a lens drive time and a drive speed.

When the transmission and reception of the lens movement command are performed at S100 and S200, the servo calculation part 322 creates a drive command (a movement speed command for a lens) from the lens target position included in the lens movement command and the current position of the lens detected (S202) by the position sensor 328 (S204). Although a drive time and a drive speed of the lens roughly have a relationship as shown in FIG. 6, there is actually displacement from a pattern shown in FIG. 6 due to a driving error or the like. Thus, creation of a speed command and lens drive based on the speed command are repeated on the basis of the target position and the current position of the lens (S202 to S212). In the present embodiment, the description is made on the case where a value received from the main CPU 214 is used for the maximum drive speed Vmax, however, the lens CPU 340 may determine a value of Vmax on the basis of the drive mode.

The created drive command is outputted to the driving circuit 324 from the servo calculation part 322 (S206), and the driving circuit 324 controls rotation direction and speed of the motor 326 by changing a duty ratio of a pulse on the basis of the movement speed command, and drive the focus lens FL. After the drive is started, the lens CPU 340 (determination part) starts drive completion determination processing (S210: a determination step) after an estimated time for completing drive "tf" (estimated time for completing movement) elapses (Yes at S208). This determination processing is performed in synchronization (in the same cycle) with drive command creation and output (S202 to S206: control steps), whereby it is possible to immediately determine drive completion. When the drive completion determination processing is finished (Yes at S212: a determination step), it is determined whether or not the motor 326 is braked (turning ON) on the basis of the brake ON/OFF information included in the lens movement command (S214: a control step). If the motor 326 is braked (Yes at S214), the driving circuit 324 simultaneously turns on the switches SW1 and SW3, or SW2 and SW4 to short-circuit coils of the motor 326 (S216: a control step), as described above.

In the present embodiment, if a drive mode is a "home position detection mode" or an "one-sided drive mode for reverse direction drive", the brake ON/OFF information transmitted form the main CPU 214 shows "brake OFF", so that the motor 326 is not braked even if the drive is completed (energization to coils of the motor 326 is maintained). In a case of other drive modes, the brake ON/OFF information shows "brake ON", so that the coils of the motor 326 are short-circuited as described above.

In the "home position detection mode", the lens is temporarily stopped after a home position (a reference position) of the focus lens FL is detected, and then immediately driven to an initial position (a lens position for focusing on a subject positioned 2, m away from the image capturing device 100, for example), and finally the drive is completed. If energization is finished by short-circuiting the coils of the motor 326 at the time of the temporary stop of the motor 326 is braked), it takes time to energize the motor 326 again and so on in order to finally drive the lens to the initial position. Thus, the lens CPU 340 maintains energization to the coils of the motor 326 without braking the motor 326 in accordance with the brake ON/OFF information after the drive of the "home position detection mode" is completed. In this case, a movement command to the initial position, which is a "subsequent lens movement command", is transmitted to the lens CPU 340 from the main CPU 214 (Yes at S104 in FIG. 5, and return to S100 to transmit a movement command to the initial position). Accordingly, it is possible to move the lens to the initial position immediately after the drive of the "home position detection mode" is completed, whereby it is possible to quickly perform the drive of the focus lens FL. In this case, the brake ON/OFF information is configured so that the motor 326 is braked after the final drive to the initial position is completed.

On the other hand, in the "one-sided drive mode for reverse direction drive", if a driving direction of the focus lens FL is opposite to an immediately previous driving direction, at the time of the "immediately previous drive", the focus lens FL is moved to the "immediately previous driving direction" more than play between the male screw and the female screw and the like described above (beyond a stop target position), and is temporarily stopped", and then is driven to a reverse direction to be stopped at a final target position. In this case as well as in the case of the "home position detection mode" described above, if energization is finished by short-circuiting the coils of the motor 326 at the time of the "temporary stop", it takes time to energize the motor 326 again and so on in order to move the lens to the final target position. Thus, the lens CPU 340 maintains energization to the coils of the motor 326 without braking the motor 326 in accordance with the brake ON/OFF information after the drive of the "one-sided drive mode for reverse direction drive" is completed. In this case, a movement command to the final target position, which is a "subsequent lens movement command", is transmitted to the lens CPU 340 from the main CPU 214 (Yes at S104 in FIG. 5, and return to S100 to transmit a movement command to the final target position). Accordingly, it is possible to move the lens to the final target position immediately after the drive of the "one-sided drive mode for reverse direction drive" is completed, whereby it is possible to quickly perform the drive of the focus lens FL. In this case, the brake ON/OFF information is configured so that the motor 326 is braked after the drive to the final target position is completed.

When processing to S216 is finished, drive completion notification is transmitted to the main CPU 214 from the lens CPU 340 (a transmission part and a reception part) (S218: a transmission step), and the main CPU 214 (a transmission part and a reception part) receives the drive completion notification (S102). It is possible to transmit the drive completion notification by varying a level between High and Low of the signal for control status communication showing an operation status of the lens CPU 340, for example.

When transmitting the drive completion notification above, the lens CPU 340 enters in a state where the lens CPU 340 can receive a subsequent lens movement command from the main CPU 214. On the other hand, when receiving the drive completion notification, the main CPU 214 enters in a state where the main CPU 214 can transmit a subsequent lens movement command to the lens CPU 340. If the lens movement is continuously performed (Yes at S104), processing is repeated by returning to S100, and if the lens movement is finished (No at S104), processing is finished.

Figure 7:
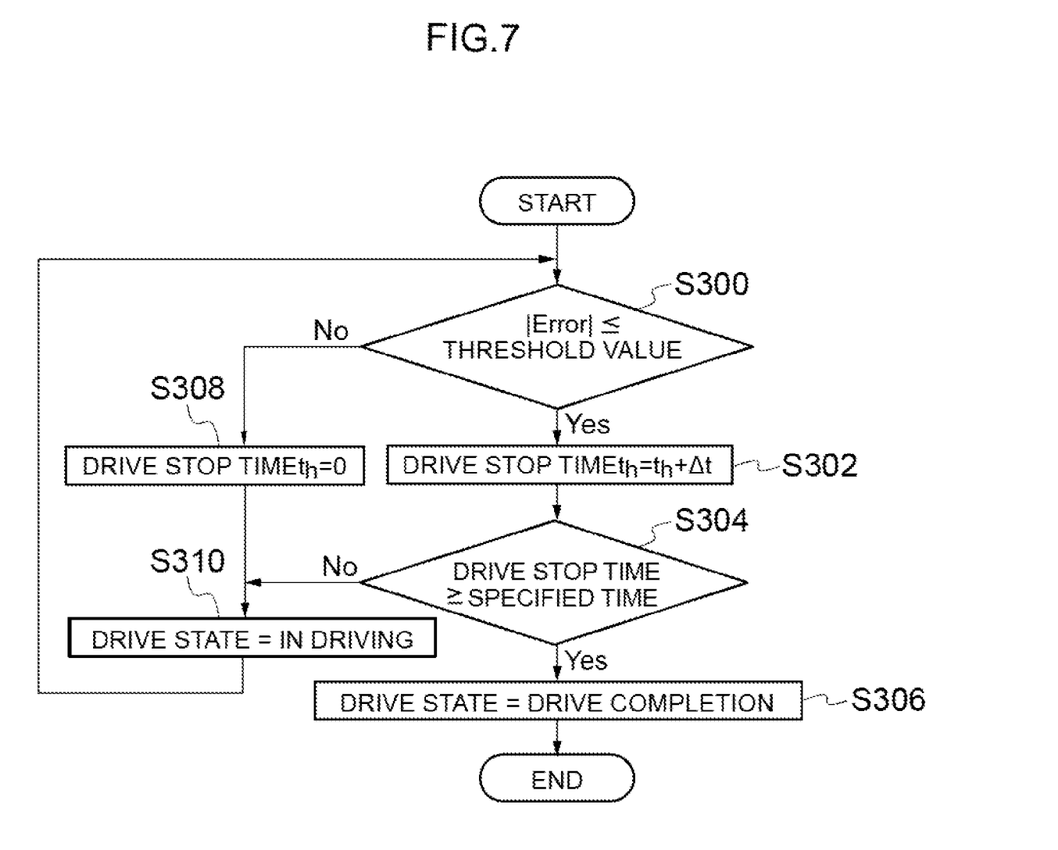
FIG. 7 is a flow chart showing determination processing of lens drive completion.

FIG. 7 is a flow chart showing a detail of the drive completion determination processing at S210 above. This processing is performed on the basis of the lens drive program stored in the ROM 344 of the lens device 300 and data required for the lens drive program. When the determination processing is started, it is determined whether or not a position error is a threshold value or less (S300). Here the position error may be an absolute value of a difference between a drive target position and a current position of the focus lens FL, and the threshold value may be a depth of focus of the focus lens FL. As described above, the target position of the lens is included in the lens movement command received from the main CPU 214, and the current position of the focus lens FL is detected by the position sensor 328. If the position error is the threshold value or less at S300 (the focus lens FL is in a drive stop state), processing proceeds to S302 to increase a chive stop time "th" of the focus lens FL (th=th+Δt), and proceeds to S304. On the other hand, if the position error is more than the threshold value at S300, processing proceeds to S308 to reset the drive stop time "th" (th=0), and proceeds to S310 to allow a drive state of the focus lens FL to be "in driving", and then returns to S300.

At S304, it is determined whether or not the drive stop time th is a specified time or more. If th is the specified time or more, processing proceeds to S306 to allow the drive state to be "drive completion" (it is determined that the focus lens FL reached the target position), and then returns to the flow of FIG. 5 to proceed to S212. If th is less than the specified time, processing proceeds to S310 to allow the drive state to be "in driving", and then returns to S300. The determination whether or not the drive stop time th is the specified time or more at S304 is performed in order to reliably determine that the drive is actually stopped. The specified time may be 5, m sec, for example.

In the flow chart of FIG. 5, energization to the coils of the motor 326 may continue without braking the motor 326 after the drive is completed, depending on contents of the brake ON/OFF information. In that case, power consumption and heat generation may become a problem depending on a type of the motor 326 and a length of duration of energization, or depending on the case that a subsequent lens movement command is not transmitted from the main CPU 214 for a long time after drive completion is transmitted (S218) and the like. Thus, in that case, the lens CPU 340 may stop energization to the coils if duration of energization becomes a predetermined time or more after the drive is completed (Yes at S212).

As described above, according to the image capturing device 100, the lens device 300, and the lens drive method and the lens drive program to be used therefor, and the recording medium in accordance with the present embodiment, it is possible to quickly perform lens drive in such a case where another drive is started immediately after lens drive is stopped, because it is possible to prevent the cases in which the lens drive takes a long time by repeatedly performing short-circuiting and energizing each time the lens is stopped and driven, and by performing communication between the lens device and the image capturing device body.

As described above, the present invention is described by referring, to the embodiment, however, the technical scope of the present invention is not limited to the scope described in the embodiment above. It is obvious to a person skilled in the art that various variations and modifications are possible to be applied to the embodiment, and it is obvious from the description of each of the claims that an aspect to which the variations and modifications are applied is included in the technical scope of the present invention.

There is no explicit description of "prior to", "in advance" and the like about the execution sequence of each of processing such as the operations, the procedures, the steps, and the stages, in the device, the system, the program, and the method shown in the claims, the specification, and the drawings, therefore, it should be noted that the processing can be achieved in any order unless an output of prior processing is used in sequent processing. Even if the operation flows described in the claims, the specification, and the drawings, are described by using "first", "next", and the like, for convenience, the description does not mean that the operation should be performed in this order.

What is claimed is:

1. A lens device to be mounted on an image capturing device body, the lens device comprising:
   a lens;
   a lens position detector for detecting a position of the lens;
   a lens driving part provided with an electric motor, the lens driving part transmitting driving force from the electric motor to the lens to allow the lens to move in an optical axis direction;
   a brake part for short-circuiting coils in the electric motor to stop the electric motor;
   a reception part for receiving a lens movement command, including a target position of the lens and brake ON/OFF information showing whether or not the brake part brakes at the target position, from the image capturing device body;
   a control part for allowing the lens to move to the target position via the lens driving part when the reception part receives the lens movement command;
   a determination part for determining whether or not the lens reached the target position on the basis of the target position and the detected lens position; and
   a transmission part for transmitting completion of the lens drive to the image capturing device body when the determination part determines that the lens reached the target position, and allowing the reception part to receive a subsequent lens movement command from the image capturing device body,
   wherein in an one-sided drive mode which allows the lens to move beyond a target position, and then to move in a reverse direction and stop at the target position, the control part controls the lens on the basis of the brake ON/OFF information so that when the lens is temporarily stopped, braking by the brake part is not applied, and only when the lens is stopped at a final target position, braking by the brake part is applied.

2. The lens device according to claim 1, wherein the determination part determines that a lens is in a drive stop state if an absolute value of a difference between the target position and the detected lens position is a threshold value or less, and after the determination, determines that the lens reached the target position if the drive stop state continues for a specified time or more.

3. The lens device according to claim 2, wherein the threshold value is a depth of focus of the lens.

4. The lens device according to claim 1, wherein the determination part starts determination after an estimated time for completing movement to the target position elapsed since a start of movement of the lens.

5. The lens device according to claim 1, wherein the control part outputs a movement speed command of the lens to the lens driving part on the basis of the detected lens position and the target position, and the determination part conducts the determination in synchronization with the output of the movement speed command.

6. A lens drive method of a lens device to be mounted on an image capturing device body, the lens device including: a lens; a lens position detector for detecting a position of the lens; a lens driving part provided with an electric motor, the lens driving part transmitting driving force from the electric motor to the lens to allow the lens to move in an optical axis direction; a brake part for short-circuiting coils in the electric motor to stop the electric motor, the lens drive method comprising the steps of:
   receiving a lens movement command including a target position of the lens and brake ON/OFF information showing whether or not the brake part brakes at the target position from the image capturing device body;
   controlling the lens to move to the target position via the lens driving part when the lens movement command is received in the step of receiving;
   determining whether or not the lens reached the target position on the basis of the target position and the lens position detected by the lens position detector; and
   transmitting completion of the lens drive to the image capturing device body when it is determined that the lens reached the target position in the step of determining to enable a subsequent lens movement command to be received from the image capturing device body,
   wherein, in an one-sided drive mode which allows the lens to move beyond a target position, and then to move in a reverse direction and stop at the target position, the lens is controlled in the step of controlling on the basis of the brake ON/OFF information so that When the lens is temporarily stopped, braking by the brake part is not applied, and only when the lens is stopped at a final target position, braking by the brake part is applied.

7. A non-transitory recording medium recording a lens drive program allowing a lens drive to perform the lens drive method according to claim 6, the lens device including: a lens; a lens position detector for detecting a position of the lens; a lens driving part provided with an electric motor, the lens driving part transmitting driving force from the electric motor to the lens to allow the lens to move in an optical axis direction; a brake part for short-circuiting coils in the electric motor to stop the electric motor; and the lens device being mounted on an image capturing device body.

8. An image capturing device comprising:
   an image capturing device body; and
   a lens device to be mounted on the image capturing device body,
   the image capturing device body including:
   a transmission part for transmitting a lens movement command to the lens device, the lens movement command including a target position of the lens and brake ON/OFF information showing whether or not the brake part brakes at the target position; and
   a reception part for receiving completion of lens drive from the lens device to enable the transmission part to transmit a subsequent lens movement command to the lens device,
   wherein the lens device is the lens device according to claim 1.

9. An image capturing device body to which the lens device according to claim 1 is mounted, the image capturing device body comprising:
   a lens movement command transmission part for transmitting the lens movement command including the target position of the lens and the brake ON/OFF information showing whether or not the brake part brakes at the target position to the reception part of the lens device.

* * * * *